US006203032B1

(12) United States Patent
Ramos

(10) Patent No.: US 6,203,032 B1
(45) Date of Patent: Mar. 20, 2001

(54) TRASH CONTAINER TRANSPORTING SYSTEM

(76) Inventor: Victor Ramos, 134 Elm St., #109, San Mateo, CA (US) 94401

(*) Notice: Subject to any disclaimer, the term of this patent is extended or adjusted under 35 U.S.C. 154(b) by 0 days.

(21) Appl. No.: 09/318,093

(22) Filed: May 25, 1999

(51) Int. Cl.[7] ....... B62B 5/00
(52) U.S. Cl. ....... 280/47.19; 280/79.5; 280/47.131; 248/907; 414/403
(58) Field of Search ....... 224/536, 637; 248/907; 280/47.131, 47.19, 7.35, 79.5; 410/77, 80; 414/331.01, 403, 408

(56) References Cited

U.S. PATENT DOCUMENTS

| | | | | |
|---|---|---|---|---|
| Re. 27,437 | * | 7/1972 | Bailey | 280/47.19 |
| D. 347,916 | | 6/1994 | Russ | D34/5 |
| 2,466,288 | * | 4/1949 | Waterman | 248/146 |
| 2,923,416 | * | 2/1960 | Vogel | 211/71 |
| 2,930,561 | * | 3/1960 | Bittle | 248/149 |
| 3,292,975 | * | 12/1966 | Chappell | 211/71 |
| 3,306,464 | * | 2/1967 | Rogers | 211/78 |
| 3,479,047 | * | 11/1969 | Bailey | 280/47.19 |
| 3,749,414 | * | 7/1973 | Lynn | 280/47.19 |
| 3,762,738 | * | 10/1973 | Christina | 280/47.19 |
| 3,830,514 | * | 8/1974 | Green | 280/47.24 |
| 3,907,117 | * | 9/1975 | Williams | 211/71 |
| 4,084,701 | * | 4/1978 | White | 211/81 |
| 4,313,612 | * | 2/1982 | Rubens | 280/79.1 |
| 4,687,405 | * | 8/1987 | Olney | 414/408 |
| 5,135,245 | * | 8/1992 | Pagone et al. | 280/79.2 |
| 5,139,299 | * | 8/1992 | Smith | 294/159 |
| 5,580,015 | * | 12/1996 | Baker | 248/145 |
| 5,853,277 | * | 12/1998 | Everhart | 414/408 |
| 5,860,659 | * | 1/1999 | Hart | 280/79.5 |

* cited by examiner

*Primary Examiner*—J. J. Swann
*Assistant Examiner*—J. Allen Shriver
(74) *Attorney, Agent, or Firm*—Goldstein & Canino

(57) ABSTRACT

A carrier for refuse containers of the type having a front and a back, a top and a bottom, wheels located on the bottom back, and a cross bar located on the front midway between the top and bottom, comprising a longitudinal main beam and a plurality of cradles supported by the main beam. Each cradle is adapted to support one of the refuse containers from the bottom thereof. A locking mechanism includes a latch hook extending from the main beam centered with respect to the cradle to selectively lock onto the cross bar of the trash receptacle, and an operating handle extending alongside the cradle for engaging the latch hook.

9 Claims, 4 Drawing Sheets

TRASH CONTAINER TRANSPORTING SYSTEM

BACKGROUND OF THE INVENTION

The invention relates to a trash container transporting system. More particularly, the invention relates to a carrier for allowing which allows a plurality of trash or refuse containers to be easily transported along a trash pickup route, whereby empty and full containers are quickly and easily interchanged along the route.

Trash pickup is usually accomplished in one of two ways: small containers located along a pickup route are dumped into a truck having a large hopper as the truck travels the route; or the entire container—usually termed a "dumpster"—is picked up and towed to a waste disposal site.

Typically transporting the entire dumpster is reserved only for large garbage containers, which are typically only used by organizations with large waste disposal needs. However, the bulk of waste carting is for smaller businesses and residential customers who each produce a relatively smaller amount of trash, and thus require smaller containers.

One standard container in common use today is configured as a tall rectangular box, having a pair of wheels on one side, a handle on that side, and a cross bar on the opposite side from the wheels. Because these containers have a fairly high capacity, they are now in common usage, they are often difficult to handle, and are especially difficult to lift for dumping purposes. Accordingly, lifting and dumping these containers is often a two person operation.

U.S. Pat. No. 3,762,738 to Christina and U.S. Pat. No. 3,907,117 to Williams both disclose carts for transporting old-style barrel shaped trash cans.

U.S. Pat. No. 5,135,245 to Pagone discloses a recycling cart which holds a plurality of arcuate bottomed containers to allow various recyclable waste to be separately compartmentalized therein. The contains have arcuate bottoms so that they would tip over without the cart and would thus not likely be stolen.

U.S. Pat. No. Re. 27,437 to Bailey, discloses a double refuse container holder which seemingly requires that the cans be hoisted in order to place the cans within the straps of the holder. Bailey is unsuitable for quick pickup and delivery of refuse containers. U.S. Pat. No. 3,306,464 to Rogers discloses a receptacle holder and support for use by barrel shaped trash cans.

While these units may be suitable for the particular purpose employed, or for general use, they would not be as suitable for the purposes of the present invention as disclosed hereafter.

SUMMARY OF THE INVENTION

It is an object of the invention to produce a trash container transporting system which allows refuse containers to be easily picked up and dropped off. Accordingly, a trailer is provided having a plurality of cradles upon which the refuse containers are easily positioned upon, and are easily removed from.

It is another object of the invention to provide a trash container transporting system which securely holds the refuse container, so that they can be transported over public highways while staying securely in their cradles. Accordingly, a latching system is provided on the carrier, for engaging and securely holding each refuse container.

It is a further object of the invention to provide a trash container transporting system which is operable by one person. Accordingly, a handle is provided immediately adjacent to each cradle for operating the latching system associated with that cradle, so that the trash container may be tipped against the cradle and pushed into the cradle while the latching system is operated.

The invention is a carrier for refuse containers of the type having a front and a back, a top and a bottom, wheels located on the bottom back, and a cross bar located on the front midway between the top and bottom, comprising a longitudinal main beam and a plurality of cradles supported by the main beam. Each cradle is adapted to support one of the refuse containers from the bottom thereof. A locking mechanism includes a latch hook extending from the main beam centered with respect to the cradle to selectively lock onto the cross bar of the trash receptacle, and an operating handle extending alongside the cradle for engaging the latch hook.

To the accomplishment of the above and related objects the invention may be embodied in the form illustrated in the accompanying drawings. Attention is called to the fact, however, that the drawings are illustrative only. Variations are contemplated as being part of the invention, limited only by the scope of the claims.

BRIEF DESCRIPTION OF THE DRAWINGS

In the drawings, like elements are depicted by like reference numerals. The drawings are briefly described as follows.

DETAILED DESCRIPTION OF THE PREFERRED EMBODIMENTS

Figure 1:
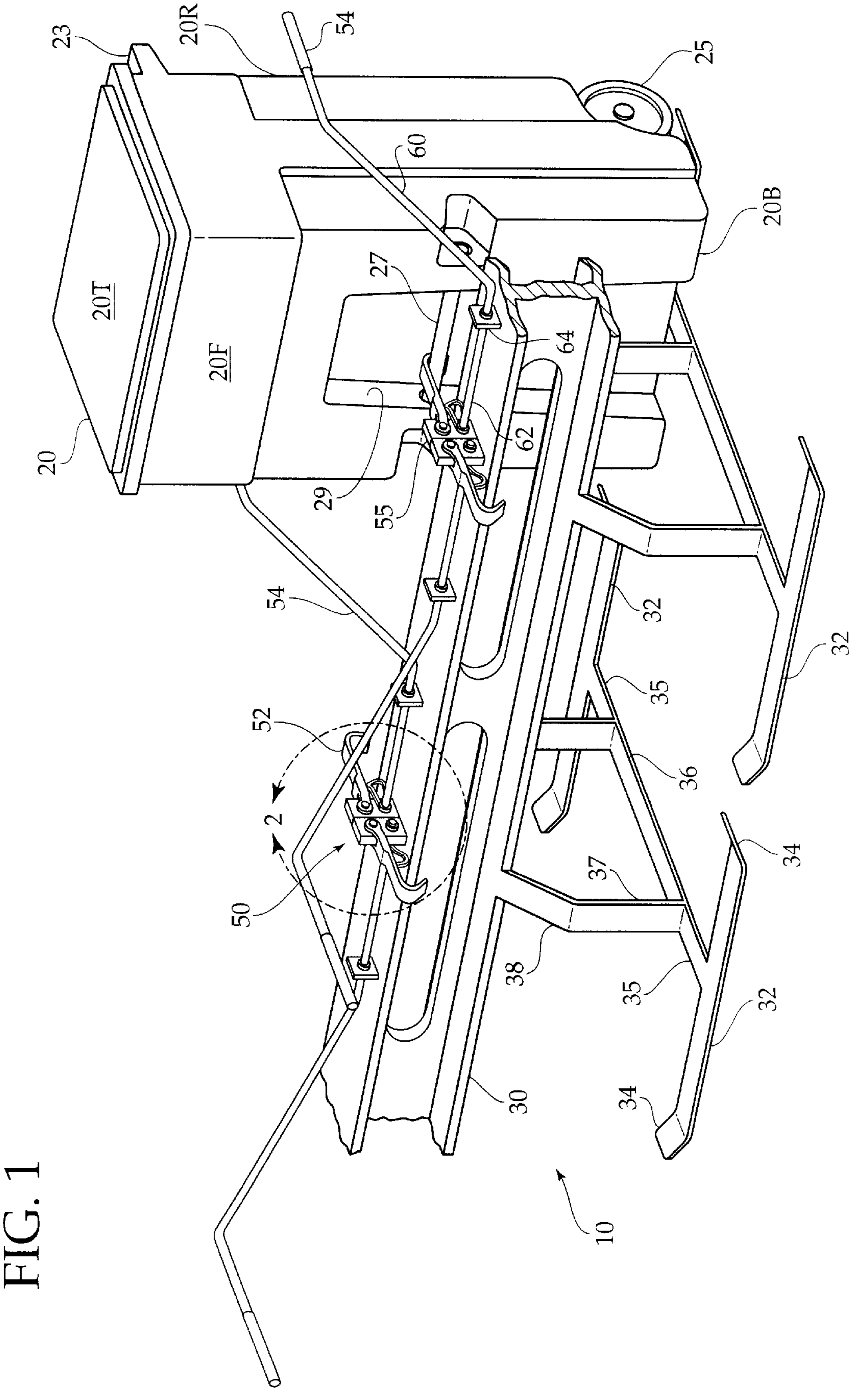
FIG. 1 is a diagrammatic perspective view, showing a portion of the carrier.

FIG. 1 illustrates a carrier 10 for transporting refuse containers 20. The refuse containers 20 are generally of the type having a front side 20F and a rear side 20R, a top 20T and a bottom 20B. A handle 23 is located on the rear side 20R near the top 20T. Wheels 25 are located on the rear side 20R near the bottom 20B. A cross bar 27 is mounted across the front side 20F, substantially mid-height between the top 20T and bottom 20B, and may be recessed into the front side 20F in a cross bar recess 29.

The carrier 10 comprises a longitudinal main beam 30, and a plurality of cradles 32 attached to the main beam 30. Each cradle 32 is supported below the main beam 30, extends substantially parallel to the main beam 30, and has two end flares 34 for maintaining the refuse container 20 thereon and resisting forces in the longitudinal direction during motion of the carrier 10. The cradle 32 is generally t-shaped, having a short leg 35.

Each cradle 32 is attached to the main beam 30 by a vertical support 37 extending substantially perpendicularly upward from the cradle 32, against which the refuse container 20 rests when it is on the cradle 32. A spacer beam 38 may be interposed between the vertical support 37 and the main beam 30 to distance the vertical support 37 from the main beam 30, to allow for the cross bar recess 29 and to provide room for locking mechanisms to operate, as will be described in further detail below.

The cradles 32 are preferably arranged in pairs, whereby each cradle 32 is preferably mated with another cradle 32 at the same longitudinal position along the main beam 30, but on an opposite side of the main beam 30, by a transverse support 36, which is generally an extension of the short leg 35 of both cradles 32, extending coplanar thereto. Accordingly, a rigid cradle network is provided by a combination of two cradles 32, vertical supports 37 which attach each cradle to the main beam 30, and the transverse support 36 which attaches the two cradles 32 and is coplanar with both.

Each refuse container 20 is held in place on the cradle, resisting transverse forces by a combination of the vertical support 37 and a latching mechanism 50. One latching mechanism 50 is provided for and associated with each of the cradles 32, in order to securely hold each of the refuse containers 20 placed therein. The latching mechanisms 50 helps facilitates the easy pick-up and drop-off of the refuse containers in accordance with the primary goals of the invention.

Each latching mechanism 50 comprises a latch hook 52, extending transverse to the main beam centered within one of the cradles 32, toward said cradle, for selectively engaging the cross bar 27 of the refuse container 20. Each latching mechanism also comprises an operating handle 54 which extends alongside said cradle 32, for allowing a user to actuate the operating handle 54 while pushing the refuse container 20 onto the cradle 32.

Figure 2:
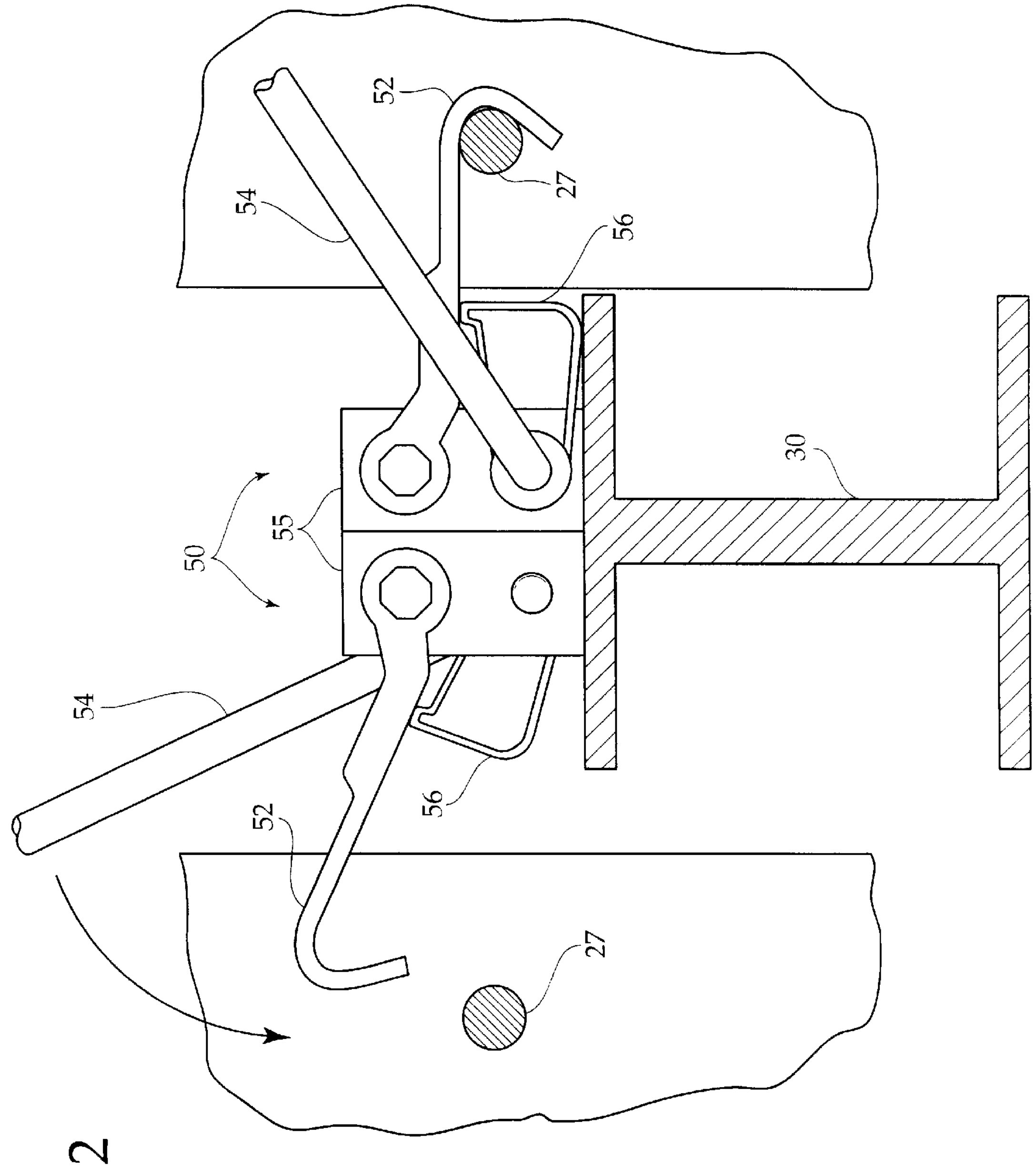
FIG. 2 is an enlarged view, taken generally in the area of circle 2 in FIG. 1, showing a pair of latching mechanisms selectively engaging a cross bar of a refuse container.

In FIG. 2, two latching mechanisms 50 are illustrated, symmetrically mounted on the main beam 30. The latching mechanisms 50 are in different operative positions to illustrate modes of operation thereof. The latch hook 52 and cross bar 27 are both separately mounted to a back plate 55. Both the latch hook 52 and cross bar 27 are mounted for rotary movement with respect to the back plate on parallel axis. As illustrated, the latch hook 52 selectively pivots upward to release the cross bar 27, or pivots downward to lock onto the cross bar 27. A cam 56 is fixedly mounted to the release handle 43 at the back plate 55 to cause the latch hook 52 to raise when the operating handle 54 is lifted.

Figure 3:
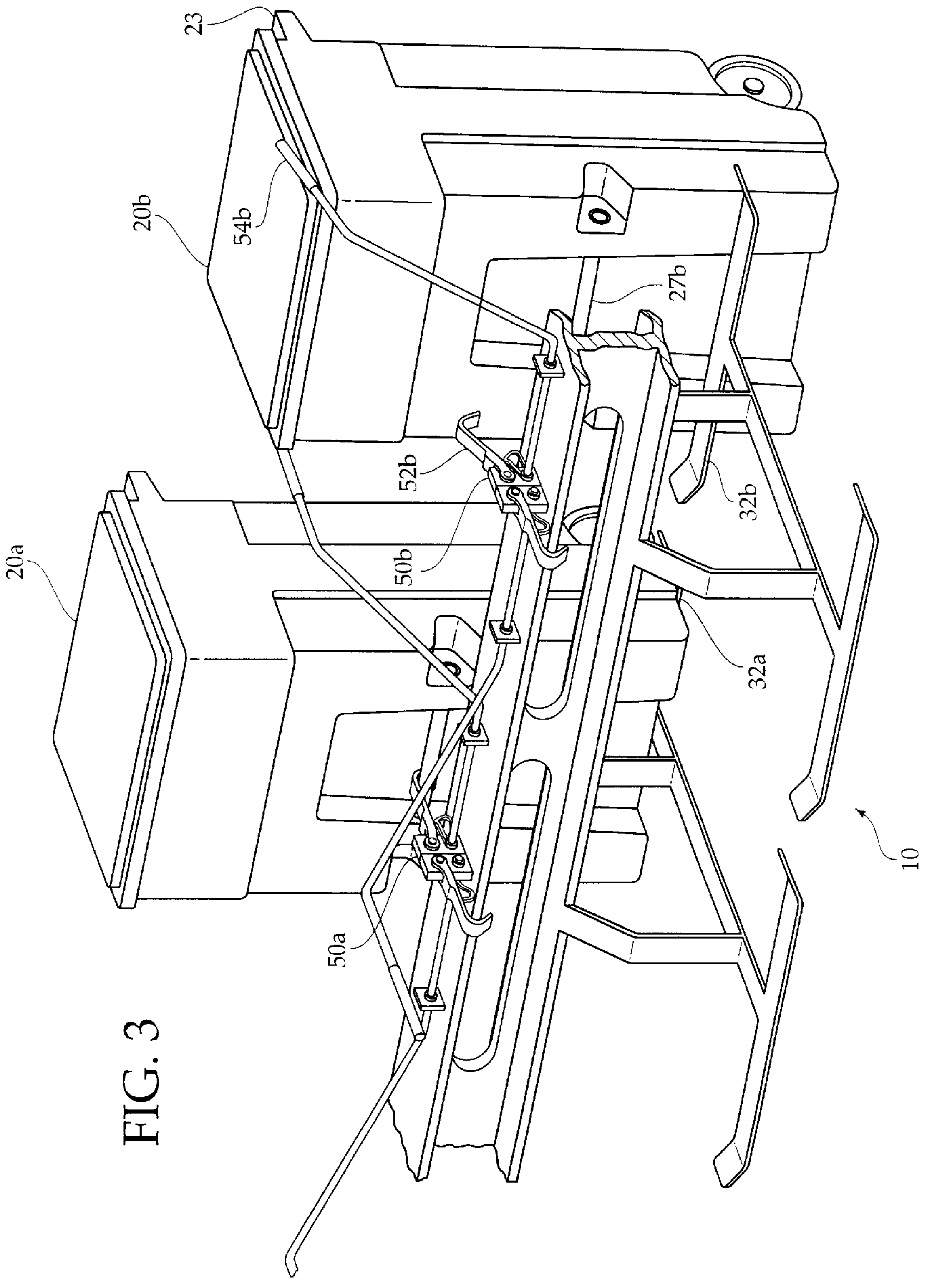
FIG. 3 is diagrammatic perspective view, showing a portion of the carrier, wherein one refuse container is present on one of the cradles and locked in place with one of the locking mechanism, and another refuse container is about to be raised onto the cradle and locked in place.

FIG. 3 illustrates the carrier 10 in use, wherein a first refuse container 20*a* is located on a first cradle 32*a*, and a second refuse container 20*b* is about to be stowed on a second cradle 32*b*. A first latching mechanism 50*a*, associated with the first cradle 32*a* and first refuse container 20*a* is naturally locked in place. A second latching mechanism 50*b*, however, has been released so that it is ready to secure onto the cross bar 27*b* of the second refuse container 20*b*. The second latching mechanism 50*b* has a second operating handle 54*b*, which has caused its associated second latch hook 52*b* to be raised in anticipation of the second refuse container 20*b* being moved into position. The second refuse container 20*b* is tilted backward on the wheels, by the handle 23 and leaned against the second cradle 32*b*. The refuse container 20*b* is then pushed up onto the second cradle 32*b*, and the operating handle 54*b* is released to cause the latch hook 52*b* to lock onto the cross bar 27*b*. Now, both the first refuse container 20*a* and the second refuse container 20*b* are ready for transporting.

Referring now back to FIG. 1, it can be noted that the operating handle is a compound structure, having an operating handle main portion 60 which extends transverse to main beam 30 and extends between the cradles 32, and an operating handle axle 62 which extends along the main beam toward the back plate 55 which is centered with respect to the cradle. The operating handle axle 62 thus allows the operating handle main portion 60 to be positioned in a location where it is easily used by a single person while hoisting or lowering the refuse containers, while allowing the latch hook to be centered on the cradle to grab the cross bar in the middle of the refuse container. Each operating handle axle 62 is supported so that it is maintained parallel to the main beam 30 by an axle support 64 mounted to the main beam 30, which allows the operating handle axle 62 to rotate freely therethrough.

Figure 4:
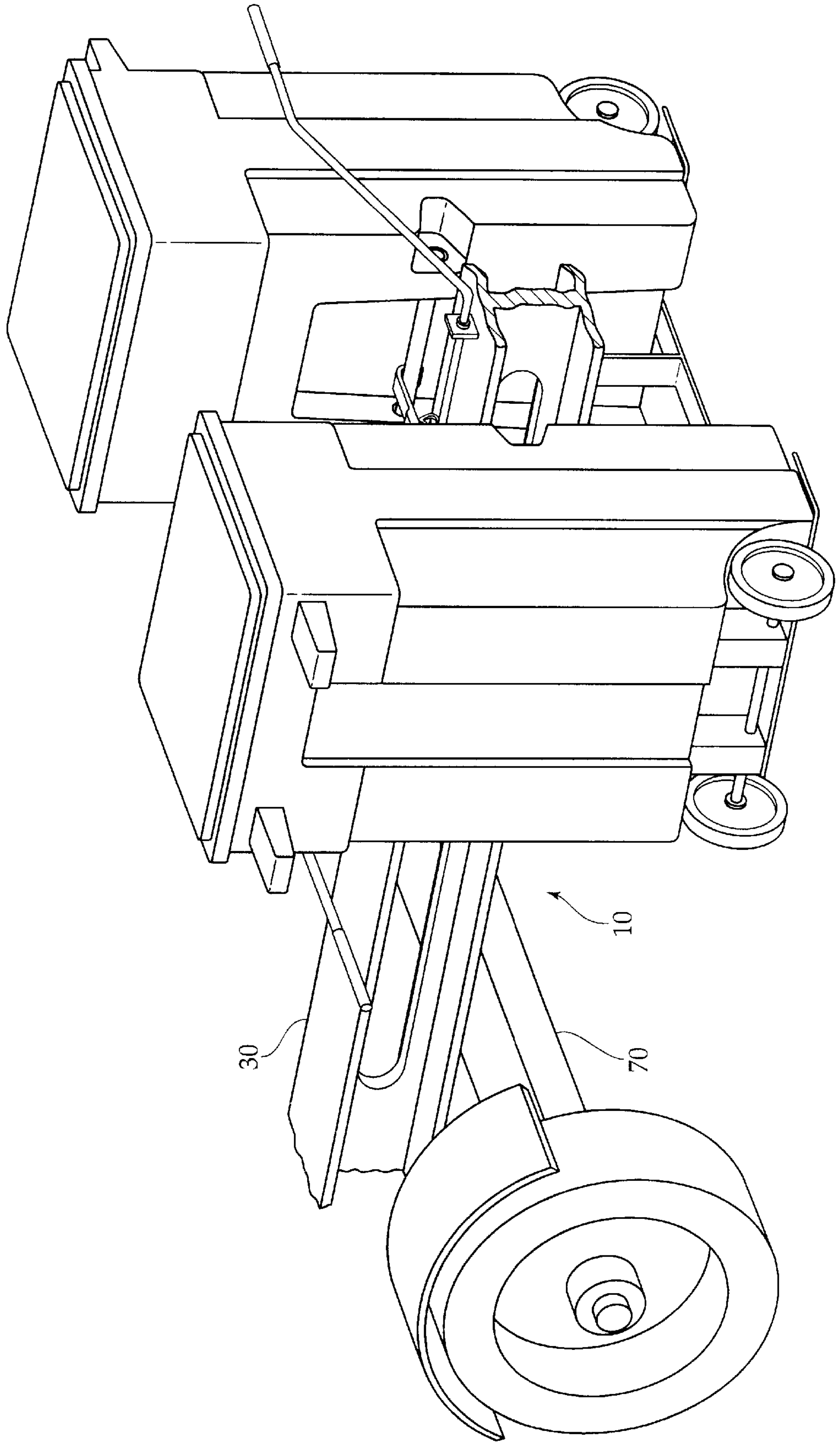
FIG. 4 is a diagrammatic perspective view, illustrating a portion of the carrier mounted upon a vehicle axle.

FIG. 4 illustrates another portion of the carrier 10, wherein a vehicle axle 70 extends transverse to, and supports the main beam 30. By having one or more vehicle axles 70, carrier 10 may be towed behind a motor vehicle. In general, each trailer can easily have ten or more carriers. Trailers can be combined so that a single motor vehicle can easily tow twenty or thirty refuse containers.

In conclusion, herein is presented a carrier for trash containers having a plurality of cradles for supporting the trash containers, which allows the trash containers to be easily and safely transported, and allows the trash containers to be quickly and easily picked up and dropped off.

What is claimed is:

1. A carrier for transporting refuse containers, each container having a front side and a back side, a top and a bottom, wheels at the bottom and back side, a cross bar extending across the front side substantially midway between the top and the bottom, the carrier comprising:

a longitudinal main beam;

a plurality of cradles, each cradle extending parallel to the main beam and rigidly attached thereto, for supporting the bottom of one of the refuse containers;

a latching mechanism associated with each of the cradles, each latching mechanism having a latch hook extending from the main beam, transverse to the main beam for selectively engaging the cross bar of the refuse container supported upon said cradle wherein each latching mechanism further comprises an operating handle which extends transverse to the main beam alongside the cradle with which the latching mechanism is associated, for causing the latch hook to selectively pivot upward or downward to selectively release the cross bar or lock onto said cross bar.

2. The carrier as recited in claim 1, wherein each cradle is located below the main beam and is attached to the main beam by a vertical support, the refuse container front leans against the vertical support when supported by the cradle and the latch hook is engaged with the cross bar.

3. The carrier as recited in claim 2, wherein the vertical support is attached to the main beam by a spacer beam which distances the vertical support from the main beam to provide the latch hook with room to pivot toward and away from the cross bar.

4. The carrier as recited in claim 3, wherein each cradle is t-shaped, having a pair of end flares and a short leg.

5. The carrier as recited in claim 4, wherein the cradles are provided in pairs located at the same longitudinal position along the main beam but on opposite sides thereof, and wherein the cradles in each pair are connected by a transverse support which is coplanar with and connected between the short legs of the cradles.

6. The carrier as recited in claim 5, wherein each latching mechanism further comprises a back plate mounted on the main beam, the latch hook and the operating handle both separately attached to the back plate for rotation with respect thereto, the latch hook and operating handle having axis of rotation which are parallel to each other, and wherein a cam is attached to the operating handle for lifting the latch hook when the operating handle is rotated.

7. The carrier as recited in claim 5, wherein the carrier further comprises at least one vehicle axis extending transverse to the main beam, so that the carrier may be operated as a trailer, towed behind a motor vehicle.

8. The carrier as recited in claim 7, wherein the back plate is centered within the cradle with which it is associated; wherein each operating handle further comprises a operating handle main portion which extends transverse to the main beam, extending from the main beam between the cradles, and comprises an operating handle axle, extending from the operating handle main portion toward the back plate, parallel to the main beam.

9. The carrier as recited in claim 7, wherein the operating handle axle is supported by an axle support mounted to the main beam.

* * * * *